United States Patent [19]

Strandine et al.

[11] 3,942,222
[45] Mar. 9, 1976

[54] POULTRY, PARTIALLY DISJOINTED

[75] Inventors: Eldon J. Strandine, Chicago; Sidney Malinow, Oak Lawn, both of Ill.

[73] Assignee: Swift & Company, Chicago, Ill.

[22] Filed: Sept. 30, 1974

[21] Appl. No.: 510,696

[52] U.S. Cl. .............................. 17/45; 17/11; 17/52
[51] Int. Cl.² .......................................... A22C 21/00
[58] Field of Search ............................ 17/11, 45, 52

[56] References Cited
UNITED STATES PATENTS

| | | | |
|---|---|---|---|
| 1,433,628 | 10/1922 | Knaust | 17/45 |
| 2,243,951 | 6/1941 | Gehlke | 17/52 |
| 2,830,319 | 4/1958 | Muntz | 17/52 |
| 2,844,844 | 7/1958 | Sieczkiewicz | 17/11 |

*Primary Examiner*—Warner H. Camp
*Attorney, Agent, or Firm*—Edward T. McCabe; Charles E. Bouton; Raymond M. Mehler

[57] ABSTRACT

Poultry is prepared for marketing to consumers such that it is in the form of a whole carcass yet is easily separable by the consumer into sections or individual piece servings. The method of preparation includes making selected incisions into specific locations on an eviscerated poultry carcass and may also include a lossening of the proximal end of each femur from its acetabulum located on the innominate bone.

19 Claims, 5 Drawing Figures

POULTRY, PARTIALLY DISJOINTED

The present invention relates to a poultry food article marketable as a whole carcass that is readily separable by the consumer into individual poultry pieces and methods for the preparation of same.

As known heretofore, poultry that has not been boned is available to the consumer in one of two forms. One is that of a "whole" bird in which the portions of the fowl that are most usually consumed are retained fully intact, with the carcass maintaining its familiar whole-fowl structure. the other is the marketing of poultry in portions or parts, such as half birds, quarters, breasts, thighs, lower legs or "drumsticks," wings, backs, and necks. While this latter form provides the advantage of improving the ease of serving the food item, it has a disadvantage in that the purchaser--either ultimate consumer or retailer--must usually pay a premium for the additional processing undertaken, by the wholesaler or retailer, in preparing the food item in such cut-up forms. In addition, a whole carcass can be readily injected with fluids such as basters, tenderizers, flavorings, and the like.

Thus, there are advantages to the purchaser of poultry food items in whole forms. However, procuring and cooking fowl in its whole form is inconvenient to the purchaser who chooses either before or after cooking, to undertake the bothersome and sometimes hazardous task of severing the skeletal and muscle structure of poultry food items that are marketed in whole carcass form.

Accordingly, it is an object of the present invention to produce a fowl carcass in a marketable form which retains the advantages traditionally associated only with whole fowl food items, but which also has attendant thereto the convenience and purchaser acceptance of cut-up fowl.

Another object of the present invention is to provide an improved method for preparing fowl food items such that they may be marketed as whole fowl carcasses while being readily severable by the purchaser, either a retailer or an ultimate consumer, into individual serving parts.

A further object of this invention is to provide an improved food article that takes the form and appearance of a poultry product in its whole, unaltered form when viewed from the breast or ventral side and is easily separable by the purchaser either before or after cooking into pieces of poultry traditionally recognized as poultry portions or as single food items.

An additional object of the present invention is to provide an improved food article that is able to be subjected to processing, treatment, packaging, and marketing techniques most advantageously utilized in connection with whole carcass poultry food items, which article is modified to render the carcass readily separable so as to result in supplying the food in a form that is easily altered by the purchaser into smaller food portions.

One other object is an improved eviscerated poultry carcass and the method for producing same, wherein the leg portions are easily separable at the hip joint or acetabulum.

The present method includes making several incisions into whole poultry carcasses at selected locations so as to partially sever or loosen portions of the carcass which may constitute poultry food servings such as those commonly called halves, wings, breasts, drumsticks, thighs, and backs. The article of the present invention is a poultry carcass that has been treated, packaged, and marketed in whole form and that can, with minimal consumer effort, be further cut and separated into traditionally recognized individual servings of fowl.

Additional objects, if not set forth specifically herein will be readily apparent to those skilled in the art from the detailed description of the invention which follows and from the drawings in which.

Figure 1:
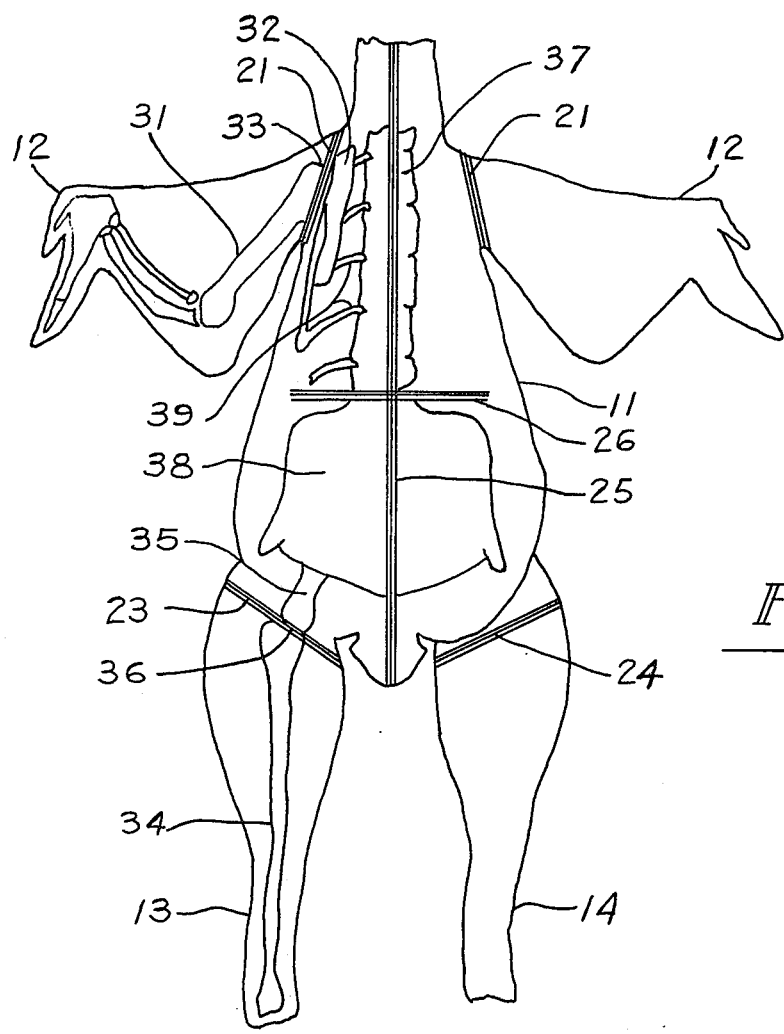
FIG. 1 is a dorsal view, with a partial skeletal structure superimposed thereon, of a whole poultry carcass depicting the preferred embodiment of this invention.

In the embodiment illustrated in FIG. 1, there is depicted the dorsal, or back, view of an eviscerated poultry carcass, indicated generally by numeral 11. Two locations of partial severance of the wings 12 are each indicated by "wing" incision 21 which represents a cut made into the dorsal side of the fowl at each shoulder "joint" 33 where the humerus bone 31 is joined to the scapula bone 32. The cut itself is through the dorsal skin and flesh and severs the joint at the anterior dorsal region, but leaves intact and unsevered the muscles, flesh and skin of the ventral areas adjacent the shoulder "joint" 33.

"Drumstick" incision 23 in left leg 13 passes through "knee joint" 36 between the tibia 34 and the femur 35. In the preferred form of the invention, drumstick incision 23 is through the skin, flesh and muscle fiber posterior of the knee joint 36 and severs joint 36 but leaves intact and does not cut through the anterior flesh, skin and muscle fiber adjacent the joint 36. The drumstick incision 23 can instead be made through the anterior flesh, skin and muscle fiber adjacent knee joint 36, and through joint 36, while the muscle fiber, flesh and skin posterior of the knee joint 36 remain intact. As a further alternative, this drumstick incision 23 may be made through the flesh, skin and muscle fiber surrounding either the right or left side of joint 36, and through joint 36, but not through the remainder of the flesh, muscle fiber and skin surrounding such joint. A second drumstick incision 24 through the knee joint of right leg 14 is made in essentially the same manner as drumstick incision 23 in left leg 13; that is, the incision begins either anteriorly, posteriorly, or from the right or left, and terminates just after passing through the knee joint of right leg 14 so as to avoid complete severance thereof.

The dorsal side of the trunk of the carcass 11 has a longitudinal incision 25 and a transverse incision 26. Longitudinal incision 25 is through backbone 37 and innominate bone 38 and extends the full length of the dorsal side of the trunk of the carcass. The incision 25 completely severs the dorsal skin, dorsal flesh, innominate bone 38 and backbone 37 of the poultry carcass 11 and may terminate in a longitudinal score line 41 on the inside of the breast bone 42 (see FIG. 2). The transverse incision 26 into the dorsal side of the carcass 11 is located immediately posterior of the backbone 37 and immediately anterior of the innominate bone 38 and extends completely through the back flesh and back skeletal structure, but has a relatively shallow depth such that it stops short of the rib cage 39 and breast bone 42.

Figure 2:
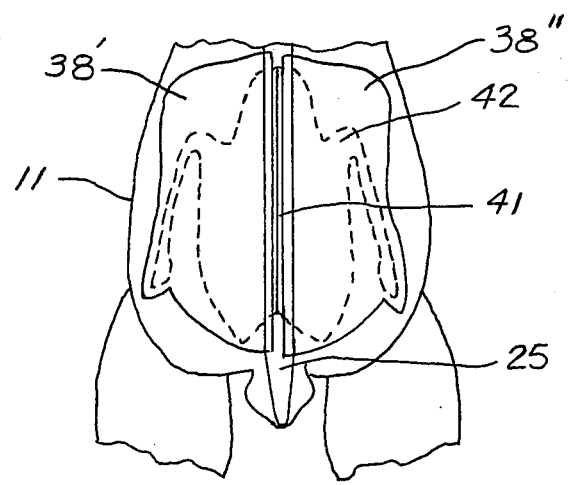
FIG. 2 is a partial view of a poultry carcass similar to that of FIG. 1 with parts spread apart to illustrate detail of another embodiment.
Figure 3:
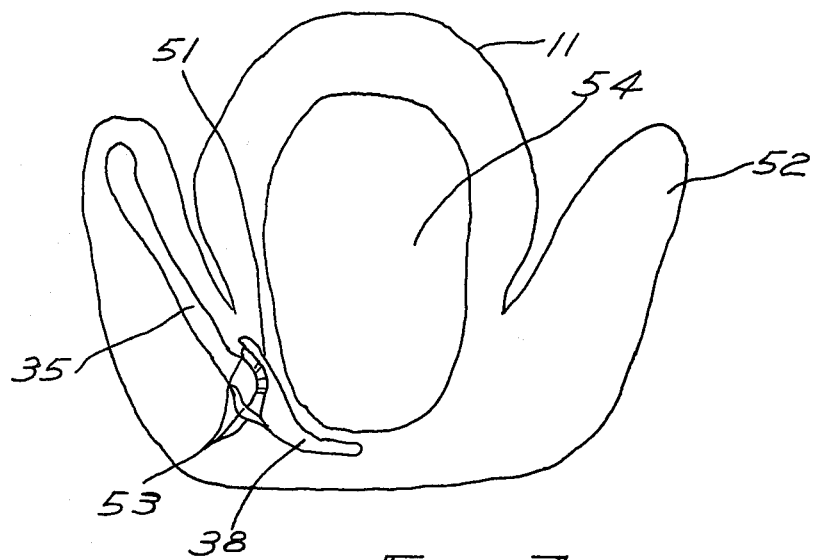
FIG. 3 is a posterior elevational illustration of the detail of a poultry carcass concerning a further embodiment.
Figure 4:
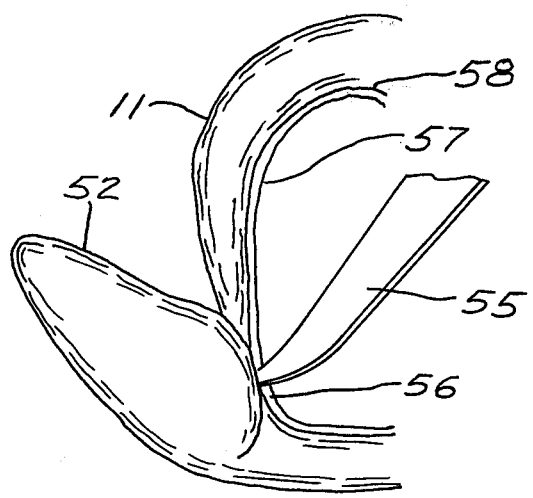
FIG. 4 is a posterior perspective view of the embodiment shown in FIG. 3 illustrating the method of this embodiment.

FIGS. 3 and 4 illustrate a further embodiment of the poultry product in which strands 53, including tendons and muscles, surrounding or naturally connected to the proximal end of each femur 35, have been severed in the area of the hip socket or acetabulum 51, but the surrounding external skin is not damaged. This embodiment permits the purchaser, either the ultimate consumer or the retailer, to easily remove through cutting that requires but a minimal effort each of the "thigh" portions of the poultry carcass. This further embodiment either can be the only modification of and improvement to a traditional whole poultry carcass or can be combined with the preferred embodiment of FIG. 1 or the combined embodiment of FIGS. 1 and 2.

Figure 5:
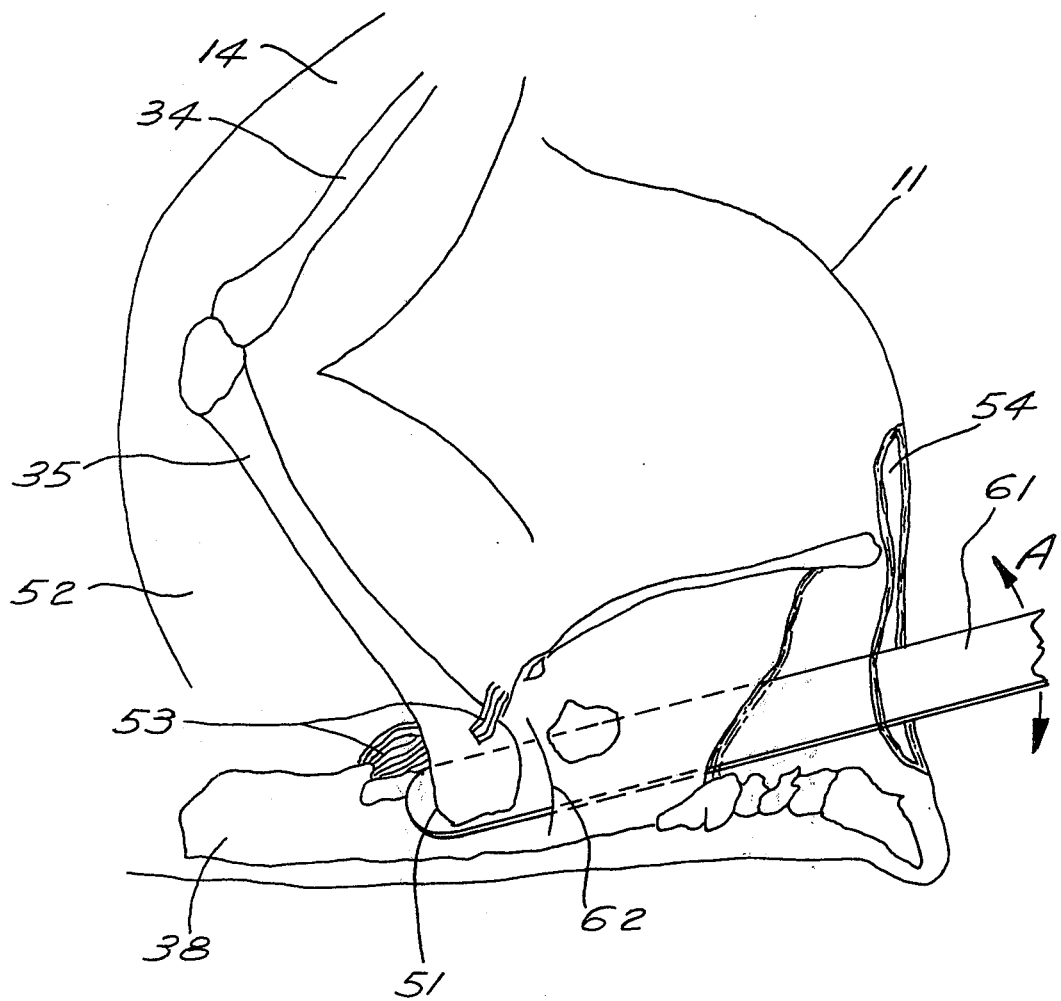
FIG. 5 is a side elevational illustration of a further method embodiment that is an alternative to that of FIGS. 3 and 4, wherein the carcass skin outlines are sketched in for orientation purposes only.

FIG. 5 illustrates a further embodiment that is an alternative to the further embodiment of FIGS. 3 and 4. In this alternate further embodiment, the proximal end of each femur 38 is loosened from each acetabulum 51, with attachment strands 53 remaining substantially unaltered from their natural connections on or surrounding the proximal end of each femur 35. In the same fashion as the further embodiment of FIGS. 3 and 4, this alternate further embodiment can be the sole improvement of an eviscerated poultry carcass or can be combined with the preferred embodiment of FIG. 1 or the combined embodiment of FIGS. 1 and 2.

In accomplishing the method of the preferred embodiment of the present invention, a band saw, circular saw or the like is utilized to cut the dorsal side of the trunk of the carcass 11 for the full longitudinal length thereof. The saw or the like is either stationary and the carcass is moved thereover or it is movable and runs along the dorsal side of the carcass. This cut or incision 25 completely severs the dorsal flesh, innominate bone 38, and backbone 37 of the carcass. In another embodiment depicted in FIG. 2, the severed innominate bone is shown as two approximate halves 38' and 38''. The carcass 11 is then slightly spread apart along cut 25, and a score line 41 is made longitudinally along the inside of the breast bone 42. This score line can be made by the same saw or the like that effected cut 25 or can be made by any other suitable implement, and it facilitates splitting of the carcass 11 along the breast bone 42 if such is desired by the purchaser.

A band saw, circular saw or the like also is utilized to make the transverse incision 26 that is across the dorsal side of the trunk, and just posterior of the back bone 37, of the carcass 11. The transverse incision 26 is relatively shallow in its depth, terminating before the saw or the like reaches a depth such that it comes into contact with the breastbone.

This incision 26, as with longitudinal incision 25, is made while the carcass is positioned with the ventral, or breast, side of the carcass 11 opposite the cutting implement. While the carcass 11 is maintained approximately in this same orientation, the shoulder joints 33 are partially severed by making wing incisions 21 on the dorsal side of the carcass, with the saw or the like stopping short of the muscle fiber, flesh, and skin on the ventral side of the shoulder joints 33.

Each partial severance or drumstick incision 23 at the portion of the leg containing the tibia 34 can be accomplished when the poultry carcass 11 is positioned with either the ventral side (breasts), the dorsal side (back), or the left or right side downward with respect to the cutting implement. In the preferred method, this partial severance or drumstick incision 23 is undertaken with the legs 13, 14 being extended so as to flex and thereby substantially straighten out naturally bent carcass knee joints 36 to thus expose to the saw or other cutting implement the dorsal surface of the joints 36.

Each of the longitudinal incision 25, the transverse incision 26, the wing incisions 21 and the drumstick incisions 23 can be made into the carcass 11 in any order. It is generally more convenient, and hence preferred, to make each of longitudinal 25 and transverse 26 incisions before any of the wing 21 or drumstick 23 incisions, particularly since these latter incisions tend to be more susceptible of being inadvertently damaged during subsequent handling.

By the embodiment depicted in FIG. 1, each femur 35 (the bone contained within that portion of poultry commonly designated as the thigh serving) remains completely unaltered at its proximal end, that is, at the joint (including the hip joint or acetabulum 51, see FIG. 3) located on the innominate bone 38. Each femur 35 remains attached to the innominate bone 38, more specifically to each respective portion 38', 38'' of the innominate bone which has been approximately halved by longitudinal cut 25.

Further embodiments of this invention include the additional feature of allowing for easy consumer severance of each thigh serving 52 or femur 35 at the acetabulum 51, whereby the proximal end of each femur 35 is loosened from the innominate bone 38. One technique of this embodiment is depicted in FIGS. 3 and 4; another technique is illustrated in FIG. 5.

In accordance with these further embodiments, the half-rounded knob at the proximal end of each femur 35 is loosened from its socket, the acetabulum 51. The poultry carcass of these embodiments thus has a loosened "hip joint" which renders the thigh serving 52 easily separable from the carcass 11 by the consumer's cutting through the skin and a few muscles adjacent to the posterior end of the innominate bone. If, for example, the consumer roasts the improved poultry carcass of the present invention prior to final severance, the consumer need merely cut the surrounding skin, and each thigh serving 52 will fall free.

More particularly, under the arrangement of the further embodiment that is illustrated in FIGS. 3 and 4, there is effected an opening up of the so-called rib cage area which is accessible through the narrow opening 56, located between the abdominal skin 58 and the abdominal wall and muscles 57 of an eviscerated poultry carcass 11. An implement 55, illustrated by but specifically not limited to a knife having a curved or hooked pointed surface, is inserted through opening 56 immediately posterior of each acetabulum 51 on the innominate bone 38. Attachment strands 53, consisting primarily of tendons and muscles surrounding or attached to the proximal end of each femur 35 are then severed by implement 55. This severance is preferably made while each thigh 52 is pulled laterally away from the carcass 11. None of the skin or flesh surrounding each thigh serving is severed or damaged to any appreciable extent, to thereby maintain the integrity of this portion of the carcass 11 and the advantages attendant thereto as discussed herein, including the appearance of a whole poultry carcass 11.

Referring now to the technique of the alternate further embodiment, depicted in FIG. 5, an implement 61 which may be a knife or other relatively sharp instrument is passed into abdominal cavity 54 and through the innominate bone 38 in the relatively thin central area thereof in order to effect a slit at line 62 in the innominate bone 38. The implement 61 is inserted through the slit at line 62 and is pried under the proximal end of the femur 38, so as to loosen same from the acetabulum 51 through leverage-like movement, represented as A, of the implement 61. Under this aspect of the invention, the femur 35 is loosened from its proximal joint, but attachment strands 53 remain substantially unaltered. Once again, none of the skin or flesh surrounding each thigh serving is severed or damaged, thereby maintaining the integrity of the carcass 11 and the advantages thereof.

The further embodiment of FIGS. 3 and 4 or the alternate further embodiment of FIG. 5 can be, in accordance with the present invention, the only improvement of and modification to the eviscerated poultry carcass 11, or either can be combined with the method of the preferred embodiment (FIG. 1) or of the embodiment illustrated in both of FIGS. 1 and 2. When either further embodiment is combined with either the embodiment of FIG. 1 or of FIGS. 1 and 2, the steps of either further embodiment may be accomplished before or after those of the preferred embodiment or of that of FIGS. 1 and 2.

While the foregoing discloses specific embodiments of the invention which have been presented in detail for purposes of illustration, it will be understood by those skilled in the art that many of these details may be varied without departing from the spirit and scope of the invention. Therefore, only such limitations should be imposed as are indicated in the appended claims.

We claim:

1. An improved eviscerated poultry carcass having a plurality of incisions positioned on the carcass at selected locations, said incisions including partial severances of both shoulder joints and knee joints, to provide an article processed as a whole carcass and exhibiting ease of separation of the carcass into individual serving pieces.

2. The improved carcass of claim 1, wherein said plurality of incisions include:
   a longitudinal incision extending along an approximate longitudinal center line for the full longitudinal length of the dorsal side of the trunk of the carcass and through the backbone and innominate bone of the carcass;
   a transverse incision extending transversely on the dorsal side of the carcass;
   a pair of wing incisions being said partial severances of both shoulder joints, each extending through the skin, flesh and muscle fiber on the dorsal side of the respective shoulder joints of the carcass and through said shoulder joints, but not through the skin, flesh, and muscle fiber on the ventral side of the respective shoulder joints; and
   a pair of drumstick incisions being said partial severances of both knee joints, each extending through a portion of the skin, flesh, and muscle fiber surrounding the respective knee joints and through said knee joints, with the remainder of the skin, flesh, and muscle fiber surrounding the knee joints remaining unsevered.

3. The improved carcass of claim 2, wherein said longitudinal incision terminates in a longitudinal score line on the dorsal side of the breastbone.

4. The improved carcass of claim 2, wherein said transverse incision is positioned immediately posterior of the backone and immediately anterior of the innominate bone, said transverse incision having a relatively shallow depth such that same terminates dorsal of the breastbone.

5. The improved carcass of claim 2, wherein the proximal end of each femur of the carcass is modified to substantially weaken the naturally firm attachment thereof to the innominate bone.

6. The improved carcass of claim 5, wherein said modification consists of a severance of the tendons and muscles surrounding said proximal end of each femur.

7. The improved carcass of claim 5, wherein said modification consists of each femur having been loosened from its respective socket in the innominate bone.

8. An improved eviscerated poultry carcass, which comprises the proximal end of each femur of the carcass being modified to substantially weaken the firm attachment thereof to the innominate bone, the external skin of said modified carcass being unsevered where it surrounds said each proximal end.

9. The improved carcass of claim 8, wherein said modification consists of a severance of the tendons and muscles surrounding said proximal end of each femur.

10. The improved carcass of claim 8, wherein said modification consists of each femur having been loosened from its respective socket in the innominate bone.

11. A method for producing an improved eviscerated poultry carcass, said method comprising the steps of:
   making a plurality of selected incisions into the dorsal side of the carcass to partially sever both wing portions, both drumstick portions, a breast portion, and a pair of portions each containing approximately half of the innominate bone of said carcass.

12. The method of claim 11, wherein said plurality of dorsal incisions include:
   making a longitudinal incision into the dorsal side of the carcass, which longitudinal incision extends the full length of the trunk thereof, is positioned along an approximate longitudinal center line thereof, and is through the backbone and innominate bone;
   making a transverse incision into the dorsal side of the carcass immediately posterior of the back bone and immediately anterior of the innominate bone;
   said partial severing of each wing portion being at its respective shoulder joint on the carcass; and said partial severing of each drumstick portion being at its respective knee joint on the carcass.

13. The method of claim 12, wherein after making the longitudinal incision same is continued and terminates by the making of a longitudinal score line upon the dorsal surface of the breastbone of the carcass.

14. The method of claim 12, including the additional step of loosening the proximal end of each femur from its respective socket on the innominate bone, to thereby facilitate the future separation at said respective socket of each of said posterior servings of the carcass.

15. The method of claim 14, wherein said additional step is accomplished by inserting a sharp implement into the narrow opening located between the abdominal skin and the abdominal wall at the posterior of said carcass; and manipulating said sharp instrument around the proximal end of each femur to sever tendons and muscles therearound.

16. The method of claim 14, wherein said additional step is accomplished by inserting a relatively sharp implement into the abdominal cavity of said carcass;

piercing the innominate bone immediately posterior of the proximal end of each femur; and further extending said relatively sharp implement to effect a prying of the proximal end of each femur from its respective socket on said innominate bone.

17. A method for producing an improved eviscerated poultry carcass, said method comprising subjecting an eviscerated poultry carcass to the step of loosening each femur from its respective socket in the innominate bone of said carcass, said loosening step being accomplished while avoiding a severance of the external skin surrounding each said respective socket of the carcass.

18. The method of claim 17, wherein said loosening step is accomplished by inserting a sharp implement into the narrow opening located between the abdominal skin and the abdominal wall at the posterior of said eviscerated carcass; and manipulating said sharp instrument around the proximal end of each femur to sever tendons and muscles therearound.

19. The method of claim 17, wherein said loosening step is accomplished by inserting a relatively sharp implement into the abdominal cavity of said carcass;

piercing the innominate bone immediately posterior of the proximal end of each femur; and further extending said relatively sharp implement to effect a prying of the proximal end of each femur from its respective joint on said innominate bone.

* * * * *